United States Patent

[11] 3,631,473

[72] Inventors Akio Yakata
Kawasaki-shi;
Kiyoshi Kubota, Tokyo, both of Japan

[21] Appl. No. 854,805
[22] Filed Sept. 2, 1969
[45] Patented Dec. 28, 1971
[73] Assignee Tokyo Shibaura Electric Co., Ltd.
Kawasaki, Japan
[32] Priority Sept. 4, 1968
[33] Japan
[31] 43/62990

[54] MANUALLY KEYED PULSE TRANSMITTER
4 Claims, 1 Drawing Fig.

[52] U.S. Cl. 340/365, 340/167
[51] Int. Cl. H04q 1/30
[50] Field of Search 340/365

[56] References Cited

UNITED STATES PATENTS

| | | | |
|---|---|---|---|
| 3,293,640 | 12/1966 | Chalfin | 340/365 |
| 3,466,647 | 9/1969 | Guzak | 340/365 |
| 3,483,553 | 12/1969 | Blankenbaker | 340/365 |

*Primary Examiner*—Harold I. Pitts
*Attorney*—George B. Oujevolk

ABSTRACT: A signalling device with a plurality of signal generating switches, a plurality of pulse generating circuits corresponding to the respective switches, are provided, as well as an encoder for encoding outputs from the pulse generating circuits to supply encoded signals to a receiving device. The signalling device applies the signal from one of the signal generating switches to the receiving device while one or more other switches are maintained in their operative condition.

Patented Dec. 28, 1971 3,631,473
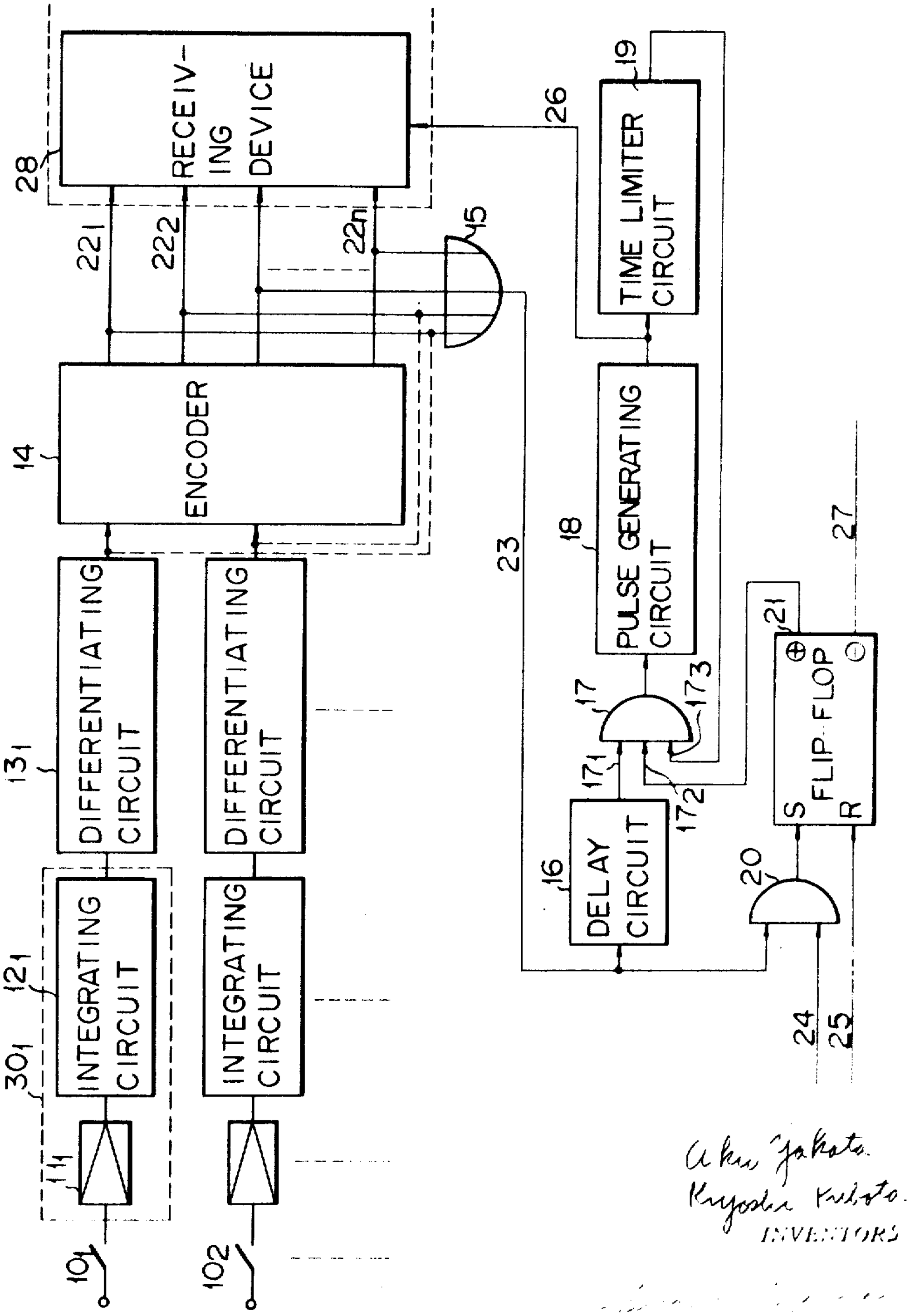
Akio Takata
Kiyoshi Kubota
INVENTORS
Attorney

MANUALLY KEYED PULSE TRANSMITTER

BACKGROUND OF THE INVENTION

This invention relates to a signalling device for applying signals to a receiving device or a utilization device from a plurality of signal generating switches such as pushbutton switches.

In one type of signalling device for applying signals to a utilization device such as an electronic computer or a typewriter by a plurality of pushbutton switches, signals are generated while the pushbutton switch is being depressed. As a consequence, while one or more pushbutton switches are being depressed, depression of another switch causes the disadvantage that signals from these pushbutton switches are superposed upon each other and a resultant signal is supplied to the utilization device, or signals generated from later operated switches are not received by the utilization device, or when more than two pushbutton switches have been depressed simultaneously signals are supplied to the utilization device in a superposed state. Accordingly, prior pushbutton switch mechanisms were constructed so that unless one previously depressed pushbutton switch was released, other pushbutton switches could not be depressed, with the result that it has been impossible to obtain a high input speed to the utilization device. On the other hand, as the speed of the input signal is increased, if the operating speed of the pushbutton switches is faster than that of the signalling device, such a device will fail to follow the high operating speed of the pushbutton switches. Further, where the utilization device is not prepared to receive input signals, the operator often misunderstands the situation and believes that the signal generated by a pushbutton switch operated by him has been accepted by the utilization device.

SUMMARY OF THE INVENTION

It is an object of this invention to provide a new and improved signalling device capable of transmitting a signal from a switch which is operated while one or more of other switches are maintained in their operative condition.

Another object of this invention is to provide a signalling device wherein the condition of the receiving device can be indicated to the operator of the signal generating switches.

In accordance with this invention there is provided a signalling device comprising a plurality of signal generating switches, a plurality of detecting circuits corresponding to each of said switches for detecting the operation thereof, a plurality of pulse generating circuits corresponding to respective one of said detecting circuits for producing output pulses a pulse width shorter than the interval of operation of said signal generating switches in response to signals detected by the detecting circuits and an encoder for encoding output pulse signals from said pulse generating circuits and therefore a receiving device connected to receive said encoded signals to which is supplied a signal from a signal generating switch which is operated while one or more other switches are maintained in their operative state, thus enabling high-speed signal inputs to be supplied to the receiving device and also remedying the aforementioned situation.

BRIEF DESCRIPTION OF THE DRAWING

This invention can be more fully understood from the following detailed description taken in conjunction with the accompanying drawing in which a single FIGURE illustrates a block diagram of one embodiment of a signalling device embodying the principle of this invention.

DESCRIPTION OF THE PREFERRED EMBODIMENTS

Referring now to the accompanying drawing a signal produced by the closure of a signal generating switch, for example, a pushbutton switch $10_1$ corresponding to a decimal number "1" is supplied to a signal detecting circuit $30_1$ including an amplifier $11_1$ and an integrating circuit $12_1$ utilized to shape the irregularity in the signal waveform caused by chattering of switch $10_1$. The signal shaped by the integrating circuit $12_1$ is supplied to a differentiating circuit $13_1$ to form a pulse signal. As is well known in the art, this pulse signal is generated by the closure of pushbutton switch $10_1$ and has a pulse width much shorter than the period during which the switch $10_1$ is held closed. By suitably designing differentiating circuits it is possible to produce pulses from differentiating circuits corresponding to respective pushbutton switches that do not superpose upon each other or cancel each other even when a switch is operated while one or more other switches are maintained in their operative state. These pulse signals are supplied to an encoder 14 comprised by a diode matrix or the like to generate encoded output signals from combinations of output terminals corresponding to a particular input terminal receiving the pulse signal. The binary code input signals encoded by the encoder 14, for example "00...001," corresponding to a decimal number "1" are supplied to a receiving device 28 over signal lines $22_1$, $22_2$,000,$22_n$. Thus, the signal supplying device constructed as above described can supply the receiving device 28 with input signals generated by closure of an additional pushbutton switch while one or more other pushbutton switches are maintained in their depressed condition thus permits enabling high-speed supply to input signals at a recurrent period equal to the pulse width of the pulse signals.

It is to be understood that the differentiating circuit may be substituted by a monostable multivibrator or a logical circuit wherein the signal, a portion of the output from the aforementioned detector circuit passed through a series circuit consisting of an inverter and a delay circuit is applied to an AND circuit together with the output from the aforementioned detector circuit.

As the speed of the input signal is increased, it becomes necessary to match the operating speed of the receiving device to that of the operating speed of pushbutton switches. To accomplish this, it is necessary to supply a synchronizing signal which is controlled to correspond to the input speed of signals to the receiving device. To produce this synchronizing signal said binary code signal "00...001" on the signal lines $22_1$, $22_2$,..., $22_n$ is applied to an OR-circuit 15. Alternatively, output pulses from differentiating circuits $13_1$, $13_2$,... may be directly supplied to the OR-circuit 15 as shown by dotted lines. When one or more signal lines of signal lines $22_1$, $22_2$,..., $22_n$ are energized by signals OR-circuit 15 operates to supply an output signal "1" to an input terminal $17_1$ of a first AND-circuit 17 via a signal line 23 and a delay circuit 16 which operates to delay the output signal from the OR-gate 15 to delay the synchronizing signal so that the receiving device 28 may receive the input signal after termination of the variation in the signal caused by the encoder 14. The output terminal of the first AND-gate circuit 17 is coupled to a pulse generating circuit 18, comprised by a monostable multivibrator, for example, the output thereof being fed back to a third input terminal $17_3$ of the first AND-circuit 17 by a time limiter circuit 19. Upon depression of pushbutton switch $10_1$ to apply a signal "1" to the input terminal $17_1$ of the first AND-circuit 17 and AND condition is established therein because the output signal "1" of the time limiter circuit is being supplied to its input terminal $17_3$ via the time limiter circuit 19. The output signal from the first AND-circuit 17 is supplied to pulse generating circuit 18 to cause it to generate a synchronizing pulse of a definite width which is supplied to the receiving device 28 via a synchronizing signal line 26. Upon receiving the synchronizing signal the receiving device 28 receives the binary code signal "00...001" on the signal lines $22_1$, $22_2$,..., $22_n$. A portion of the output signal from the pulse generating circuit 18 supplied to the time limiter circuit 19 causes it to supply a signal "0" to input terminal $17_3$ of the first AND-circuit 17 after elapse of a predetermined time interval. As a consequence, even when another pushbutton switch, for example, $10_2$ is depressed inadvertently at an instant after the receiving device 28 has received the signal from pushbutton switch $10_1$ the receiving device 28 can not receive the signal from switch $10_2$ because of the absence of the synchronizing signal on the synchronizing signal line 26. Thus, by proper setting of the time at which the signal "0" is applied to the input terminal $17_3$ of the first AND-circuit 17 from time limiter circuit 19 the receiving device 28 is conditioned not to receive the signal by such inadvertently operated switch under the circumstances mentioned above.

Where the time limiter circuit 19 is not used, it is not necessary to use the first AND-circuit 17. In this case, the output signal from delay circuit 16 may be supplied directly to the pulse generating circuit 18.

The output signal from OR-circuit 15 on the signal line 23 is also supplied to an input of a second AND-circuit 20, which is also supplied with the signal from the receiving device 28 via a signal line 24. The output of the second AND-circuit 20 is coupled to a set terminal S of a memory device such as a flip-flop circuit 21, the reset terminal R thereof being connected to a signal line 25 from the receiving device 28. The plus output terminal of the flip-flop circuit 21 is connected to a second input terminal $17_2$ of the first AND-circuit 17 while the minus output terminal to a signal line 27.

Where the receiving device 28 is prepared to receive signals from the signal supplying device, the receiving device operates to apply a signal "0" on signal line 24. As a consequence, even when one of the pushbutton switches is depressed to apply a signal "1" on signal line 23 AND condition would not be established in the second AND-circuit 20 whereby the output signal thereof will not set flip-flop circuit 21. Thus, the flip-flop circuit 21 will continue to supply a signal "1" to input terminal $17_2$ of the first AND-circuit 17 through its plus output terminal. Under these circumstances, an AND condition is established in the first AND-circuit 17 because of the presence of the signal "1" on input terminals $17_1$ and $17_3$, thus creating a synchronizing signal to permit receiving device 28 to receive binary code signals on the signal lines $22_1$, $22_2$,..., $22_n$.

Where it is not desired to permit the receiving device 28 to receive signals from the signal supplying device, the receiving device 28 is set to apply a signal "1" to signal line 24. When one of the push button switches is depressed to apply a signal "1" to the signal line 23 an AND condition is established in the second AND-circuit 20 and the output signal therefrom sets the flip-flop circuit 21 to supply a signal "0" to the input terminal $17_2$ of the first AND-circuit 17 from plus output terminal. Under these conditions, although a signal "1" is supplied to input terminals $17_1$ and $17_3$, the AND condition is not established in the first AND-circuit 17 thus generating no synchronizing signal so that the receiving device 28 can not receive binary code signals on the signal lines $22_1$, $22_2$,..., $22_n$.

When set the flip-flop circuit 21 supplies a signal "1" to the signal line 27. As a result, by connecting the signal line 27 to a suitable display or warning device (not shown) it is possible to display an alarm so that an input signal generated by a depressed pushbutton switch will not be received by the receiving device 28 when it is set to receive signals from the signal supplying device. Where the output from the flip-flop circuit 21 is not supplied to any element other than the input terminal $17_2$ of the first AND-circuit 17 the second AND-circuit 20 and the flip-flop circuit 21 may be eliminated. Thus, in this case, the same result as above described can be obtained by applying a phase inverted signal of the signal on the signal line 24 to the input terminal $17_2$ of the first AND-circuit 17.

Where the receiving device 28 is set to receive input signals from the signal supplying device, a signal "1" is applied to the reset terminal R of the flip-flop circuit 21 over signal line 25 to reset the same. Then a signal "1" will be applied to the first input terminal $17_3$ of the first AND-circuit 17 from the plus output terminal of the flip-flop circuit 21. Accordingly, where input signals are arriving at a high speed, when the receiving device 28 has been set to a condition not to receive any input signal, reception of input signals can be precluded and it is possible to indicate or give an alarm to the switch operator the fact that he has depressed a pushbutton switch while the receiving device can not receive any input signal.

As herein described, this invention provides a novel signalling device wherein input signals can be applied at high speeds by making it possible to apply input signals by depressing a second switch to the receiving device while one or more first pushbutton switches are maintained in their depressed state. It is also possible to prevent reception of input signals where the operating speed of the switches exceeds that of the signal supplying device and also to prevent reception of input signals when the receiving device is set not to receive any input signal. Under these conditions if a pushbutton switch is operated the signalling device can display or given an alarm by such operation.

What we claim is:

1. A signalling device comprising a plurality of signal generating switches, a plurality of detecting circuits for detecting the operation of said switches, each including an amplifier corresponding to a respective one of said switches and an integrating circuit connected to the output of said amplifier, a plurality of pulse forming circuits corresponding to a respective one of said detecting circuits each including a differentiating circuit being connected to the output of said integrating circuit and producing output pulses having a pulse width shorter than the interval of operation of said signal generating switches in response to signals detected by said detecting circuits, an encoder for encoding the output pulse signals from said pulse forming circuits and applying to a receiving device said encoded signals from a signal generating switch even while one or more other signal generating switches are maintained in their operative state, an OR circuit connected to receive said output pulse signals or said encoded signals, a delay circuit connected to delay the output signal from the OR circuit a predetermined time, a first AND circuit connected to receive the output signal from the delay circuit, a pulse generating circuit responsive to the output signal from said first AND circuit for generating a synchronizing signal, a time emitter circuit connected between an output terminal of said pulse generating circuit and an input terminal of said first AND circuit to control said pulse generating circuit such that until a predetermined time interval elapses after generation of one synchronizing signal, the generation of the next succeeding synchronizing signal is prevented and means to apply said synchronizing signal to said receiving device to control the reception of said encoded signals.

2. The signalling device according to claim 1, wherein said first AND circuit further receives from said receiving device a phase inverted signal representing the signal receiving condition of said receiving device to cause said receiving device to receive said encoded signals only when it is set to receive said encoded signals.

3. The signalling device according to claim 1, further comprising a second AND circuit connected to receive the output signal from said OR circuit and a signal from said receiving device, said signal representing the signal receiving condition of said receiving device, and a memory element for storing the output signal from said second AND circuit to supply the output thereof to said first AND circuit to cause said receiving device to receive said encoded signals only when it is set to receive said encoded signals.

4. The signalling device according to claim 3 wherein said memory element is connected to a display or warning device which indicates or gives an alarm the fact that a signal generating switch is operated when said receiving device is not set to a condition under which it can receive encoded signals.

* * * * *